J. W. COBURN.
FRONT AXLE AND BOLSTER CONSTRUCTION FOR VEHICLES.
APPLICATION FILED FEB. 25, 1918.

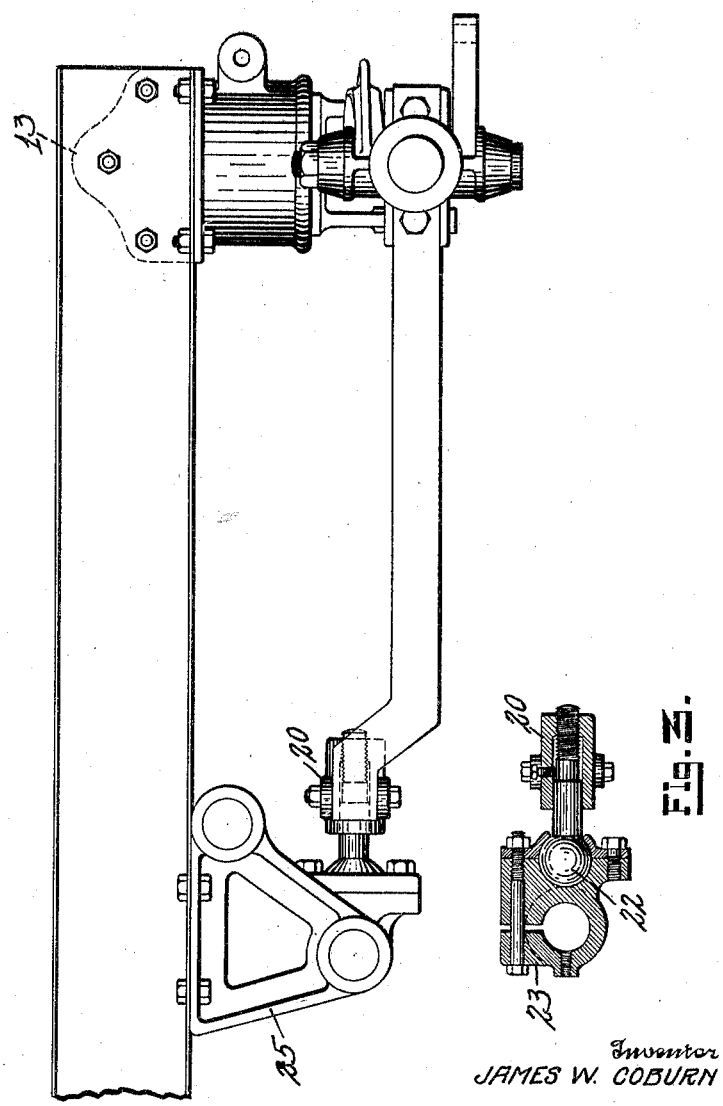

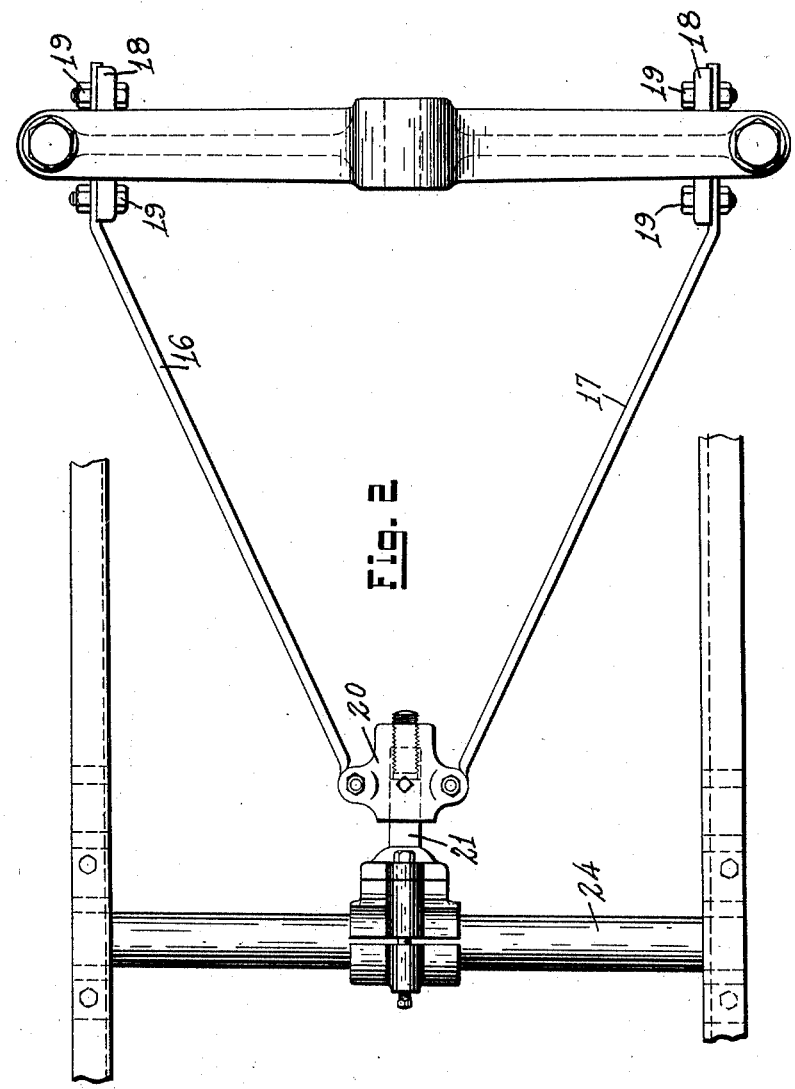

1,302,634.

Patented May 6, 1919.
3 SHEETS—SHEET 3.

Inventor
JAMES W. COBURN

By Charles E. Wiser
Attorney

UNITED STATES PATENT OFFICE.

JAMES W. COBURN, OF HIGHLAND PARK, MICHIGAN.

FRONT AXLE AND BOLSTER CONSTRUCTION FOR VEHICLES.

1,302,634.  Specification of Letters Patent.  Patented May 6, 1919.

Application filed February 25, 1918. Serial No. 218,978.

*To all whom it may concern:*

Be it known that I, JAMES W. COBURN, a citizen of the United States, residing at Highland Park, county of Wayne, State of Michigan, have invented a certain new and useful Improvement in Front Axle and Bolster Construction for Vehicles, and declare the following to be a full, clear, and exact description of the same, such as will enable others skilled in the art to which it pertains to make and use the same, reference being had to the accompanying drawings, which form a part of this specification.

This invention relates to front axle and bolster construction for vehicles, and its object is to provide a bolster construction for supporting the forward end of a vehicle frame on the axle spring-supported in pivotal relation therewith, whereby the inequality of the road surface tending to continuously alter the relative position of the axle to the frame does not distort the frame. Other objects are involved in the detailed construction of the bolster and manner of support on the axle, and means for maintaining the axle at all times transversely to the frame preventing undue strain on the pivotal connection. These and other objects and the several features of the invention are hereinafter more fully described and shown in the accompanying drawings in which—

Figure 1 is a side elevation of a bolster and axle embodying my invention.

Fig. 2 is a plan view showing the means of maintaining the axle transversely of the framework.

Fig. 3 is a detail in section showing the means of adjusting the length of the radius rods connecting the front axle and a portion of the framework and the pivotal connection of the rods with the framework.

Figure 4:
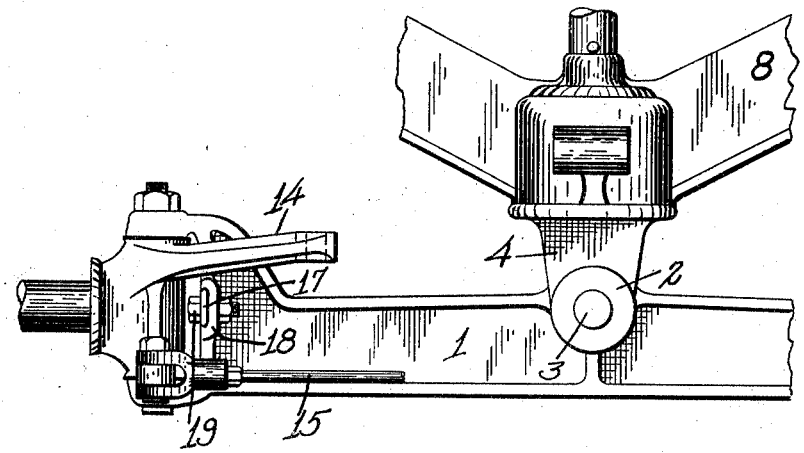
Fig. 4 is a front elevation of the bolster connection with the axle.

Heretofore the general practice has been to support the frame at two points on the axle adjacent each end thereof, a spring being interposed between the frame and the axle. With such construction the variation of the axle from horizontal line causes distortion and twist of the framework and by the construction herein disclosed a distortion of the framework due to the variations of the axle from horizontal position is reduced to a minimum in that the axle is free to oscillate relative to the frame being pivotally connected to the framework, the spring being interposed between the pivotal point and the frame to take up shock due to the inequalities of road surfaces. As will be understood from Figs. 4 and 5, the axle 1 is provided at the center with a boss 2 apertured to receive a pin 3 extending therethrough. A yoke 4 is provided having the ends of the arms apertured to receive the shaft or pin 3. The upper end of the yoke is cup shaped as indicated at 5 and having a central boss 6 to receive a vertical shaft 7 secured therein. The bolster 8 is provided with a complemental cup member 9 adapted to receive the cup member 5 of the yoke as indicated particularly in Fig. 5, and this cup member 9 is also provided with a central bearing or boss 10 to receive a shaft 7 which extends therethrough and is provided thereabove with a pin 11 preventing the bolster from moving upward off from the shaft end, it being understood that the shaft 7 is secured in the boss or bearing 6 of the yoke. A coiled spring 12 of the necessary tension is interposed between the cup members 5 and 9. The bolster 8 consists of two similar arms as will be understood from Fig. 4, extending parallel with the axle in a vertical plane and secured to the frame as indicated at 13 on opposite sides of the forward end thereof and within the limitations allowed by the pin 11 and the end of the cup member 5. The frame may move vertically relative to the axle, it being cushioned in such movement by the spring 12.

The manner of pivoting the yoke 4 to the axle 1 allows the axle to oscillate in a vertical plane about the pin 3 without in any manner disturbing the horizontal position of the frame supported by the bolster and thus the vibrations of the axle caused by the inequalities of the road surface traveled is not transmitted to the frame member which is the principle of this invention.

Figure 5:
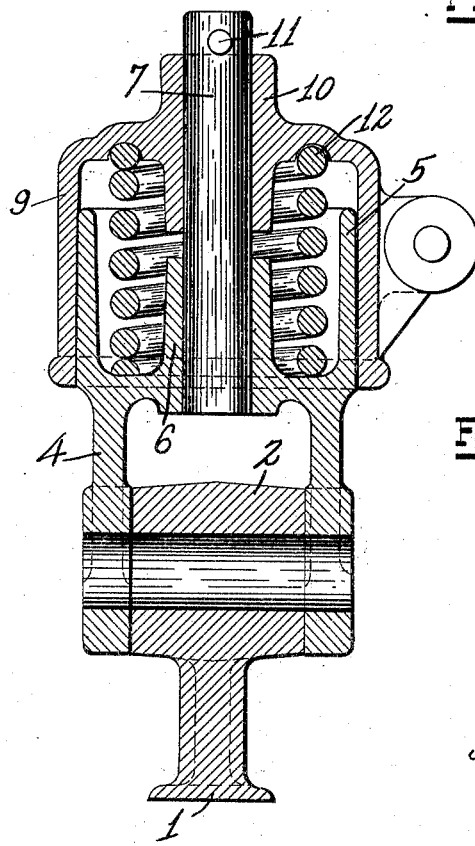
Fig. 5 is an enlarged detail in section of the central portion of the bolster showing the means for spring-supporting the bolster relative to the axle.

The axle 1 is of the usual type having a fork or yoke at the end to receive a spindle and knuckle of the wheel which is adapted to be turned by means of the arm 14 as is usual, and the knuckle shown in Fig. 4 is connected by means of a rod 15 with a knuckle at the opposite end of the axle (but not here shown) so that the two knuckles and wheels are simultaneously turned to equal degree in guiding the vehicle. Inasmuch as the front axle is connected with the framework at but the single point shown, provision must necessarily be made to prevent a turning of the axle in a horizontal plane. For this purpose I have provided two radius rods 16 and 17, the fork of the axle at each end being provided with a grooved plate 18 in each instance preferably formed integrally with the axle adapted to receive the ends of the radius rods 16 and 17, the same being bolted in position by means of the bolts 19 as shown. These rods extend toward the rear of the framework and are attached centrally of the framework to an apertured block 20 as indicated in Figs. 1, 2 and 3. This block is apertured centrally to receive a stem 21. The central aperture of the block fits the shaft at the rear end and at the forward end is threaded to receive the threaded end of the stem as will be understood from Fig. 2. The stem is provided with a ball end 22 supported in a socket provided in a block 23 that may be attached to a transverse shaft 24 extending from one side of the vehicle to the other and supported in brackets 25 at each end. This ball and socket connection allows the axle 1 to freely vibrate in a vertical plane without distortion of the radius rods and, by reason of the threaded relationship of the block 20 and the stem, inaccuracies of the position of the shaft or of the bolster may be compensated for, and the shaft positioned exactly transversely of the framework.

It is, of course, evident that the block 23 providing the socket for the ball may be of any desired type, the particular construction thereof here shown for attaching to a shaft as for instance 24, being not material to the invention.

From the foregoing description it becomes evident that the construction shown and described allows the axle to vibrate in a vertical plane without transmitting the vibrations to the supported frame and also further enables the frame to be spring-supported relative to the axle, and the axle at all times maintained exactly transversely of the framework.

Having thus briefly described my invention, what I claim and desire to secure by Letters Patent of the United States is—

1. In a vehicle, an axle, a yoke pivoted to the axle to oscillate in a vertical plane longitudinally thereof, said yoke being formed with a cylindrical cup-shaped member, a complemental cup-shaped member fitting thereover in telescopic relation, a frame member to which said complemental member is attached, a spring positioned between the cup-shaped members, and means for rigidly holding the axle in position transversely to the frame adapted to allow the axle to oscillate in a vertical plane.

2. In a vehicle, an axle, a frame member spring-supported at the center of the axle only, in a manner to allow the axle to oscillate in a vertical plane transversely of the frame, braces extending rearwardly from the axle, a universal joint connecting the rear ends of the braces to the frame member substantially in a vertical plane passing through the longitudinal axis of the frame, the connection of the braces with the frame member through the axle joint being adjustable substantially for the purpose described.

3. In a vehicle, an axle, a frame member, a cup shaped member pivoted to the axle in a manner to allow the member to oscillate longitudinally of the axle, and a spring interposed between the frame member and said pivotal member.

4. In a vehicle, an axle, a frame member, a yoke pivoted to the axle to oscillate in a vertical plane longitudinally of the axle, the yoke being provided with similar members in telescopic relation, a spring interposed between the two telescoping members, means for limiting the extent of vertical movement between the members, and means for rigidly holding the axle in position transversely of the frame.

5. In a vehicle, an axle, a frame member, a cylindrical member pivotally supported on the axle at the center thereof to swing longitudinally of the axle, a corresponding cylindrical member on the frame in telescopic relation with the first named cylindrical member, a spring interposed therebetween, means limiting the vertical movement between the telescoping members, a pair of radius rods each connected at one end near the respective ends of the axle and connected by means of the axle joint to a portion of the frame in a vertical plane passing through the longitudinal axis of the frame.

In testimony whereof, I sign this specification.

JAMES W. COBURN.